Oct. 6, 1936.  F. S. GRUVER ET AL  2,056,351
DIAPHRAGM TYPE GAUGE
Filed July 7, 1932
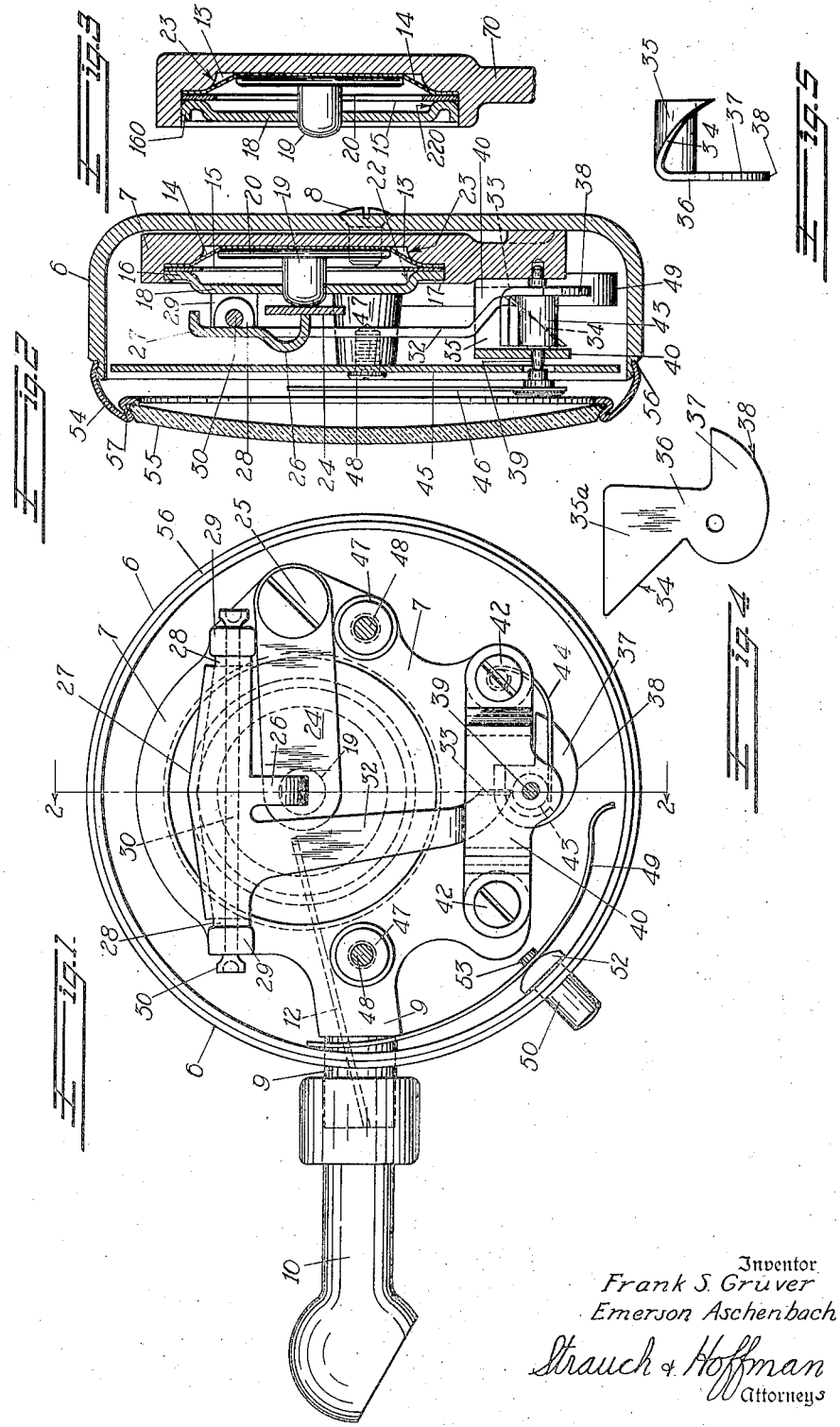
Inventor
Frank S. Gruver
Emerson Aschenbach
Strauch & Hoffman
Attorneys Patented Oct. 6, 1936

2,056,351

UNITED STATES PATENT OFFICE 2,056,351

DIAPHRAGM TYPE GAUGE

Frank S. Gruver and Emerson Aschenbach, Sellersville, Pa., assignors to United States Gauge Company, New York, N. Y., a corporation of Pennsylvania Application July 7, 1932, Serial No. 621,254

6 Claims. (Cl. 73—110)

This invention relates to pressure gauges of the diaphragm type, and its primary object is to produce a satisfactory tire gauge of that type.

Present commercial forms of tire gauges are of two general types, embodying either a Bourdon tube or a plunger for response to pressures. Neither of these two forms fully satisfies the requirements that the gauge must be capable of withstanding severe shocks and other abuses, must be sensitive and accurate throughout its life and must be easy to read. Another requisite, from a sales viewpoint, is simplicity and inexpensiveness of design.

The Bourdon tube type of tire gauge more closely approaches these standards of perfection than does the plunger type, since the latter is inconvenient to handle and to read and is less sensitive and accurate, especially over long periods of time. The former, however, is open to the objection that through rough handling its Bourdon spring may become distorted, with resultant inaccuracy of indication.

The diaphragm type of instrument would make an ideal portable tire gauge if it could be manufactured in light, inexpensive and compact form and yet of a design to successfully withstand repeated shocks and applications of high pressures. Heretofore it apparently had been deemed impossible to produce a satisfactory gauge of the diaphragm type which would remain accurate and withstand the relatively high air pressures of vehicle tires.

Accordingly it is the primary object of this invention to construct a portable tire gauge of light weight and of rugged though inexpensive design, and embodying a small diaphragm assembly. Some of the subordinate objects, which contribute to the success of this main object, are as follows:

It is an object of the present invention to devise a compact and light diaphragm assembly capable of withstanding relatively high pressures. In this connection it is a more specific object to provide a yielding resistance at one side of the diaphragm in such manner that the latter serves almost entirely to transmit pressures—i. e., in such manner that the diaphragm acts primarily like a piston but without any possibility of the peripheral leakage that usually escapes past a piston.

Another object of this invention resides in the provision of a novel mechanism particularly adapted to transmit the diaphragm movement to an indicating element.

A further object of the present invention consists in forming the casing and framework of the gauge of light material, such as duralumin, whereby the instrument is better able to withstand the shocks produced by bumping or dropping.

Another object of our invention is to provide a novel mounting arrangement, for the peripheral edge of the diaphragm, which will protect the latter during assembly and during subsequent operation.

A still further object of the present invention consists in devising a special cam, as part of the mechanism interconnecting the diaphragm and the indicator, having a compensating curvature which permits the use of a uniformly calibrated dial scale for the measurement of corresponding uniform pressure changes.

It is also an object of this invention to provide a double-cam structure, having one cam portion designed for transmitting pressure responses of the diaphragm, and another cam portion for use in resetting the mechanism after each reading. In this connection it is a further object to design the first mentioned cam portion so that it will positively return the mechanism to "zero" position after release of pressure and during the resetting operation.

It will be appreciated that some of the above objects result in improvements, the structure and principles of which may be readily utilized in instruments of other types.

These and additional objects will appear from a study of the following detailed description and its appended claims when taken in conjunction with the accompanying drawing, wherein:

Figure 1 is a face view of a tire gauge representing a suitable embodiment of the present invention, the crystal and dial assembly having been removed for clarity of illustration.

Figure 2 is a sectional view taken vertically on the plane of the line 2—2 in Figure 1.

Figure 3 is a detail view showing, in vertical section, a preferred form of diaphragm assembly for use in an instrument like that of Figures 1 and 2.

Figure 4 is a plan or development view of the double-cam element, in its blank form prior to final shaping and assembling.

Figure 5 is a detail view of the double-cam element formed from the blank of Figure 4. This view represents a rear elevation of the element as it appears in Figure 2.

With continued reference to the drawing, wherein like numerals are employed to designate like parts, and with particular reference for the moment to Figures 1 and 2:

The gauge body or framework consists essentially of two parts, a cup-shaped casing 6 and a die cast base plate 7. The latter is firmly secured against the inner side of the casing back by a screw 8 and has an integral stem 9 projecting outwardly through the casing to detachably receive a conventional connection device 10 that is designed to be pressed upon a tire valve. A hole 12 is drilled through the stem and the base plate to establish communication between the connection 10 and a diaphragm chamber 13, which was formed during the die casting operation.

The casing 6 and the base plate 7 are made from a light metal or composition. An aluminum alloy, such as duralumin, preferably is utilized since it imparts strength to the gauge body while rendering the latter light in weight and better able to withstand rough handling. This is especially desirable in a tire gauge of the portable type which is carried around in the vehicle and which is frequently dropped during use.

The base plate forms a socket for the reception of a diaphragm 14, an annular gasket 15 and a top plate 16. The edge of the top plate is forced against the gasket, as by working on the edge of the socket to form an overhanging circular head 17, whereby the periphery of the diaphragm is firmly held and sealed against its supporting ledge on the base plate to form the chamber, 13.

The top plate 16 has a central flat portion 18 which serves primarily to position and guide the actuating pin 19 of a disc 20, rather than as a safety stop device for protecting the diaphragm as has been proposed in prior gauge constructions. This portion 18 is smoothly and uniformly joined to the rim of the plate to provide a curved surface at 22 for protecting the gasket and diaphragm against damage during assembly and during subsequent operation. In like manner, the base plate has a smoothly curved surface 23 which protects the diaphragm material, especially when the latter flexes in operation. The importance of the feature will be realized by comparing the area of the disc 20 with the effective area of the diaphragm. The comparison shows that substantially all of the diaphragm flexure takes place adjacent the curved surface.

The diaphragm assembly of Figure 3 differs from that of Figure 2 only in that the base plate, 70, is slightly thicker than the plate 7 so as to accommodate a top plate 160 of different design. The latter has its edge flanged backwardly so as to provide a smoothly curved pressure surface 220 and at the same time to provide a cylindrical periphery permitting the plate to be inserted with a forced fit and thereafter frictionally retained in clamping position.

The diaphragm consists of any suitable material, either metallic or non-metallic, and with or without corrugations. In spite of the relatively high pressures to be measured, there may be used such light materials as silk, goldbeater's skin, and varnished cambric. This is because the diaphragm, although it must be leak proof, need not necessarily be able to withstand very great pressure. It acts merely as a dividing wall or piston, as will be seen later.

The pin 19 is rigidly carried by the disc 20 centrally thereof. The disc may be cemented or soldered to the diaphragm, but preferably is merely in unattached surface contact therewith, since the linear operating range is short and the pin is substantially supported and guided by the top plate 18. In such an arrangement, where the diaphragm is not bound to a disc or the like, the entire central portion of the diaphragm, within its secured margin, is free to move naturally during operation and under other conditions. For example, any contraction or expansion, due to temperature or humidity variations, is not confined exclusively to the diaphragm area between the disc and the secured margin but is distributed uniformly through the whole flexible body. This helps to permit the use of a light material and lengthens the life of the latter.

A regulator spring in the form of a flat steel arm 24 is employed to yieldingly resist the outward movement of the pin 19 when air pressure is admitted behind the diaphragm. One end of this arm is secured to the base plate by a screw 25, and its other end bears against the outer rounded end of the pin 19. The spring arm has relatively great strength and hence, due also to the fact that the disc 20 is of such large diameter as to substantially cover the entire working area of the diaphragm, the combined diaphragm and disk act somewhat as a plunger working within a cylinder, the small annular unbacked portion of the diaphragm serving merely to seal the pressure chamber. This annular portion is the only one that has to withstand the pressures, but it has this capacity because of its narrow width and its firm reenforcement at the marginal edge.

The spring arm 24 is interposed between the button 19 and a curved finger 26 that integrally extends from a one-piece cam lever 27 which forms part of a movement mechanism. This cam lever, properly ribbed as shown to combine lightness with strength, has a pair of perforated ears 28 disposed adjacent a corresponding pair of spaced lugs 29 that are integral with the base plate. An elongated pin 30 passes through the ears and lugs, and has both ends expanded as shown, to pivotally mount the lever upon the base plate. The cam lever 27 includes a swinging arm 32 in substantial parallelism with the base plate, and having one end laterally offset and provided with a special cam tip 33.

The cam tip 33 engages and cooperates with a special curved surface 34 that is formed on one cam 35, of a double-cam element 36. This element 36 has a second cam 37 provided with a curved edge 38. As seen in Figure 4, the double-cam element may be formed from a flat blank properly cut to shape so that the only necessary steps to produce the device seen in Figure 5, consist in bending the wing 35a laterally relative to the wing 37 and then rolling the wing 35a into the substantially cylindrical form which it has as a cam (35) in Figure 5. The curved surface 34 may be produced on the blank, or it may be cut after the device of Figure 5 has been formed.

The double-cam element 36 is rigidly mounted, as by soldering, upon a pointer shaft 39, one end of which is journaled in the base plate and the other end of which has a bearing in a U-shaped bridge member 40. The latter completely bridges the cam element and has its ends secured to the base plate by screws 42. The central part of the shaft is enlarged at 43 to form a shoulder for lateral engagement with the cam 37 and for frictional engagement with a wire spring 44. The latter is mounted under tension by one of the screws 42 and its purpose is to brake the shaft 39 by imposing a constant yielding resistance to oscillation thereof.

The outer end of the shaft 39 projects through a scaled dial 45 and has fixed thereon an indicating pointer 46 which is designed to sweep over the scale of the dial. The dial is fastened to a pair of lugs 47 on the base plate by a pair of screws 48.

As the cam lever 32 swings outwardly in response to pressure placed behind the diaphragm when the nipple 10 is applied to a tire valve, the camming tip 33 slides along the cam surface 34 to cause oscillation of the double-cam element 36 in a clockwise direction in Figure 1, thus causing the pointer 46 to oscillate with the shaft 39 to produce a pressure reading on the dial scale. The cam tip 33 and cam surface 34 are specially designed to compensate for angularity and other factors in a movement that usually are corrected by calibration of a dial scale into units that are marked off in different lengths on the scale. The compensation afforded by the present invention permits the utilization of invariable or uniform scale units, which correspond exactly with uniform increases or differences in pressure.

The spring brake 44 serves to hold the pointer in its indicating position. For returning the pointer to zero after the reading has been taken, the following reset mechanism is provided:

A flat spring 49 has one end enlarged and anchored by projecting the stem 9 through it, and has its other end curved and disposed adjacent the cam 37. Intermediate the spring ends there is provided a reset button 50, which reciprocates through the casing wall. This button has its outward movement limited by an enlargement 52, and has a small integral pin 53 projecting through the spring to prevent lateral displacement thereof.

Upon pressing the thumb against the outer end of the button 50, the free curved end of the spring 49 will be thrust against the cam surface 38 which, during the pressure indication, is disposed somewhere between the curved spring end and its own zero position shown in Figure 1. The double-cam element thus will be caused to oscillate in a counter-clockwise direction against the resistance of the braking and steadying spring 44, and during this oscillation the cam surface 34 will slide along the cam tip 33 and positively return the cam lever 27 to its initial position while setting the pointer back to zero.

The complete operation of the gauge should now be clear without further description.

The open face of the casing 6 is closed by a crystal assembly comprising a bezel ring 54 and a crowned celluloid member 55. The ring is lightly and somewhat resiliently formed of metal and has one edge snapped or pressed into a circular groove 56 on the casing rim. The other edge of the ring is curved and flanged inwardly to provide a convenient annular pocket 57 into which the celluloid member may be snapped.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressure gauge comprising a base plate; a diaphragm mounted on said plate to form a pressure chamber; a pressure-transmitting device engaged with said diaphragm on the side opposite said chamber; a relatively stiff flat spring anchored on said plate and urged against said transmitting device; an indicator supported by said plate and designed to remain in its maximum attained position upon decrease of pressure below an attained maximum; and mechanism mounted between said spring and said indicator to actuate the latter in response to deflection of the spring, whereby said spring will not move said indicator from its maximum attained position upon relief of pressure.

2. In the combination defined in claim 1, said mechanism including a lever pivoted on said plate and having an integral finger projecting into contact with said spring.

3. In a resettable measuring instrument comprising a framework having a responsive element and an indicator shaft mounted thereon; mechanism for interconnecting said responsive element and said indicator shaft, said mechanism comprising: a rigid double-cam member mounted to oscillate with said indicator shaft and having two cam portions, one of which extends substantially radially from said shaft and the other of which extends partially around said shaft and is disposed at an angle relative to said radially extending portion; a cam member extending between said responsive element and one of said cam portions, and manually operable resetting means disposed adjacent the other of said cam portions for cooperation therewith.

4. A measuring instrument comprising a base plate; a responsive element mounted on said base plate; an approximately U-shaped member mounted on said base plate; an indicator and a shaft therefor, one end of said shaft being journaled in the base plate, and the other in said U-shaped member; and means for transmitting movement of said element to said indicator; said means comprising a cam mounted on said shaft and within said U-shaped member for oscillation with said indicator, and a cam lever pivoted on the framework; said cam lever having a finger connected with said responsive element, and an arm projecting through said U-shaped member into engagement with said cam.

5. A shock-proof tire pressure gauge of the type wherein readings are taken after removal of the gauge from the pressure source, said gauge comprising a relatively light framework having a cup-shaped recess, an apertured plate closing the open end of said recess, a relatively light pressure responsive assembly including a thin, fragile diaphragm cooperating with said recess to form a pressure chamber, a reenforcing member unattached to, but adapted to engage substantially all of the free surface of said diaphragm and having a projection adapted to extend through the aperture in said apertured plate whereby said reenforcing member is guided, resilient means engaging said projection to urge said reenforcing member and diaphragm firmly against the bottom of said recess when the pressure is relieved in said pressure chamber whereby the diaphragm will be protected against vibrations, and an indicating mechanism adapted to be actuated by the movement of said reenforcing member and to remain in indicating position when the pressure is relieved in said pressure chamber.

6. A shock-proof tire gauge of the type wherein the indicating mechanism remains in its maximum position after the pressure is removed from the gauge, said gauge comprising a framework of light metal such as an aluminum alloy, a thin, fragile pressure-responsive diaphragm mounted on said framework for communication with a pressure source, said framework providing a large flat surface against which said diaphragm is adapted to lie in surface engagement when it is in inoperative position, means connecting said indicating mechanism and said responsive diaphragm, and means opposing the effect of pressure on said diaphragm, and holding the latter in its normal inoperative position with substantially all of its free surface in contact with said flat surface when no pressure is applied to said diaphragm, whereby the latter is better able to withstand shocks, said last-mentioned means comprising a flat plate member engaging said diaphragm and adapted to clamp the latter between it and said flat surface, said plate member having an area nearly as great as said flat surface, said means comprising a part of said first mentioned means.

FRANK S. GRUVER.
EMERSON ASCHENBACH.